US012387457B2

(12) United States Patent
Liao et al.

(10) Patent No.: US 12,387,457 B2
(45) Date of Patent: Aug. 12, 2025

(54) IMAGE CAPTURING DEVICE AND IMAGE CALCULATION METHOD

(71) Applicant: ASUSTeK COMPUTER INC., Taipei (TW)

(72) Inventors: Chun-Hao Liao, Taipei (TW); Hsiu-Ting Yang, Taipei (TW)

(73) Assignee: ASUSTEK COMPUTER INC., Taipei (TW)

( * ) Notice: Subject to any disclaimer, the term of this patent is extended or adjusted under 35 U.S.C. 154(b) by 418 days.

(21) Appl. No.: 17/822,162

(22) Filed: Aug. 25, 2022

(65) Prior Publication Data
US 2023/0085693 A1 Mar. 23, 2023

(30) Foreign Application Priority Data

Sep. 17, 2021 (TW) .................................. 110134961

(51) Int. Cl.
*G06V 10/60* (2022.01)
*G06T 5/40* (2006.01)
(Continued)

(52) U.S. Cl.
CPC ................ *G06V 10/60* (2022.01); *G06T 5/40* (2013.01); *G06V 10/25* (2022.01); *G06V 10/751* (2022.01);
(Continued)

(58) Field of Classification Search
CPC ............. G06T 2207/10144; G06T 5/50; G06T 2207/10024; G06T 2207/20208;
(Continued)

(56) References Cited

U.S. PATENT DOCUMENTS 7,535,511 B2 5/2009 Wu et al.
10,482,585 B1 11/2019 Lin
(Continued)

FOREIGN PATENT DOCUMENTS

| CN | 110177221 A | * | 8/2019 | ........... H04N 5/2351 |
| CN | 108616689 B | * | 10/2020 | ......... H04N 5/23219 |

(Continued)

*Primary Examiner* — Sumati Lefkowitz
*Assistant Examiner* — Anna Lei
(74) *Attorney, Agent, or Firm* — McClure, Qualey & Rodack, LLP

(57) ABSTRACT

An image capturing device with a sensor, a memory, and a processor is provided. The sensor captures an image of at least one target. The memory stores a plurality of instructions. The processor obtains the plurality of instructions to perform the following steps: controlling the sensor to capture a reference image and a processed image; capturing a first bright region and a dark region from the reference image, and capturing a second bright region from the processed image; performing calculations on a first brightness value of the first bright region and a second brightness value of the second bright region respectively with at least two first brightness thresholds, to obtain a first low exposure compensation value and a second low exposure compensation value; and obtaining a high exposure compensation value according to comparisons between a third brightness value of the dark region and at least two second brightness thresholds.

15 Claims, 5 Drawing Sheets

(51) Int. Cl.
*G06V 10/25* (2022.01)
*G06V 10/75* (2022.01)

(52) U.S. Cl.
CPC ............... *G06T 2207/10144* (2013.01); *G06T 2207/30168* (2013.01)

(58) Field of Classification Search
CPC .......... G06T 5/40; G06V 10/60; G06V 10/25; G06V 10/751; G06V 10/42
See application file for complete search history.

(56) References Cited

U.S. PATENT DOCUMENTS

| | | | |
|---|---|---|---|
| 2002/0176010 A1* | 11/2002 | Wallach | ............... H04N 23/741 |
| | | | 348/229.1 |
| 2007/0115372 A1* | 5/2007 | Wu | ........................ H04N 23/71 |
| | | | 348/230.1 |
| 2008/0050109 A1* | 2/2008 | Noyes | .................... H04N 23/71 |
| | | | 396/234 |
| 2011/0007192 A1 | 1/2011 | Watanabe | |
| 2012/0120279 A1* | 5/2012 | Li | ........................ H04N 23/741 |
| | | | 348/E5.037 |
| 2015/0015740 A1 | 1/2015 | Cho et al. | |
| 2015/0235353 A1* | 8/2015 | Yi | ............................. G06T 5/50 |
| | | | 382/167 |
| 2020/0195827 A1* | 6/2020 | Wang | ..................... H04N 23/71 |

FOREIGN PATENT DOCUMENTS

| | | |
|---|---|---|
| CN | 109788207 B | 3/2021 |
| TW | I705708 B | 9/2020 |

\* cited by examiner

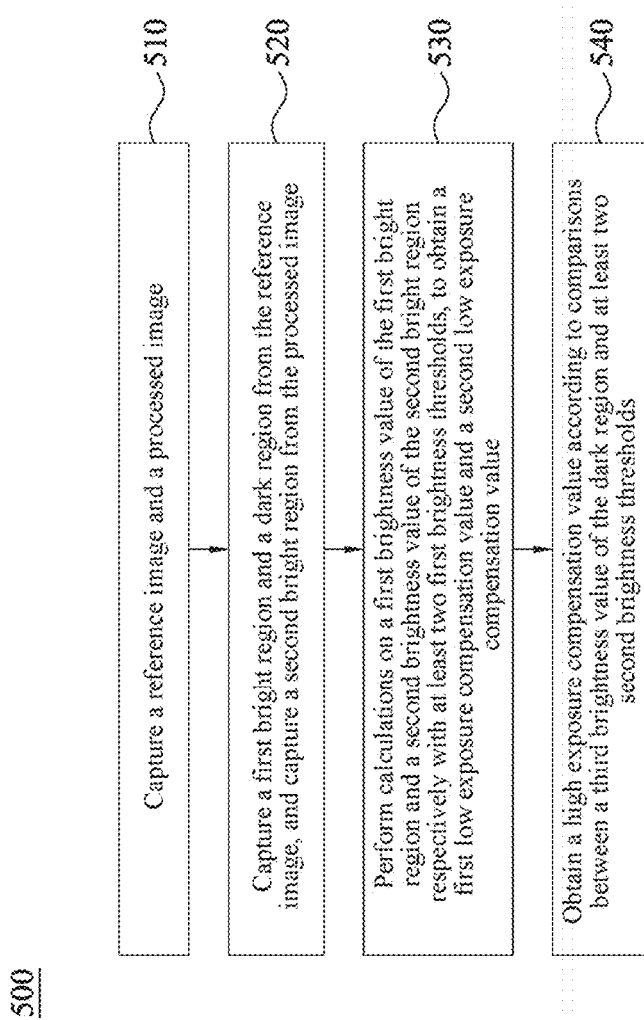

IMAGE CAPTURING DEVICE AND IMAGE CALCULATION METHOD

CROSS-REFERENCE TO RELATED APPLICATION

This application claims the priority benefit of Taiwan Application Serial No. 110134961, filed on Sep. 17, 2021. The entirety of the above-mentioned patent application is hereby incorporated by reference herein and made a part of the specification.

BACKGROUND OF THE INVENTION

Field of the Invention

The disclosure relates to an image capturing device and an image calculation method for same.

Description of the Related Art

In existing high-dynamic-range imaging (HDR), in most cases, a camera is used to shoot a plurality of images with different exposure values for synthesis. Designed different exposure values are assessed by a basic exposure image as a benchmark, which is a scene detection algorithm. This method is susceptible to some regions that are too dark/too bright in the environment. Input images of different exposures estimated by using the method are brighter/darker, which further affects the tolerance of the synthesis quality, resulting in a relatively high probability of the occurrence of ghosting or shadowing.

BRIEF SUMMARY OF THE INVENTION

According to the first aspect of the disclosure, an image capturing device is provided. The image capturing device includes: a sensor, configured to capture an image of at least one target; a memory, configured to store a plurality of instructions; and a processor, configured to obtain the instructions from the memory to perform the following steps: controlling the sensor to capture a reference image and a processed image; capturing a first bright region and a dark region from the reference image, and capturing a second bright region from the processed image; performing calculations on a first brightness value of the first bright region and a second brightness value of the second bright region respectively with at least two first brightness thresholds, to obtain a first low exposure compensation value and a second low exposure compensation value; and obtaining a high exposure compensation value according to comparisons between a third brightness value of the dark region and at least two second brightness thresholds.

According to the first aspect of the disclosure, an image calculation method is provided. The image calculation method includes: capturing a reference image and a processed image; capturing a first bright region and a dark region from the reference image, and capturing a second bright region from the processed image; performing calculations on a first brightness value of the first bright region and a second brightness value of the second bright region respectively with at least two first brightness thresholds, to obtain a first low exposure compensation value and a second low exposure compensation value; and obtaining a high exposure compensation value according to comparisons between a third brightness value of the dark region and at least two second brightness thresholds.

Therefore, according to the technical content of the disclosure, the image capturing device and the image calculation method described in the embodiments of the disclosure can improve the tolerance of quality of synthetic images, thereby reducing occurrence of ghosting or shadowing.

After referring to the embodiments below, a person of ordinary knowledge in the technical art easily understands the basic spirit and other inventive objectives of the disclosure, as well as the technical means and implementations adopted in the disclosure.

BRIEF DESCRIPTION OF THE DRAWINGS

To make the foregoing and other objectives, features, advantages, and embodiments of the disclosure more comprehensible, the accompanying drawings are described as follows:

FIG. 5 is a flowchart of an image calculation method according to yet another embodiment of the disclosure.

Figure 1:
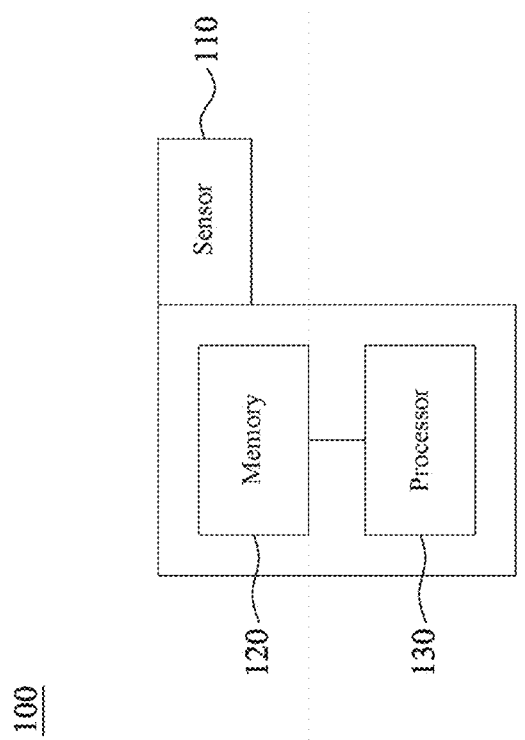
FIG. 1 is a schematic diagram of an image capturing device according to an embodiment of the disclosure.

According to the usual way of working, various features and elements in the drawings are not drawn to scale, and the way of drawing is intended to present the specific features and elements related to the disclosure in the best way. In addition, in different drawings, the same or similar reference signs are used to refer to similar elements/components.

DETAILED DESCRIPTION OF THE EMBODIMENTS

As used herein, "couple" means that two or more elements are in direct physical or electrical contact with each other, or are in indirect physical or electrical contact with each other, or means that two or more elements cooperate or interact with each other.

As shown in FIG. 1, an image capturing device 100 includes a sensor 110, a memory 120, and a processor 130. In terms of connection relationship, the sensor 110 is coupled to the memory 120, and the memory 120 is coupled to the processor 130.

To improve the tolerance of quality of synthetic images, and reduce the occurrence of ghosting or shadowing, the disclosure provides the image capturing device 100 shown in FIG. 1. Operations related to the image capturing device 100 are described below in detail.

In an embodiment, the sensor 110 is configured to capture an image of at least one target. The memory 120 is configured to store a plurality of instructions. The processor 130 is configured to obtain the plurality of instructions from the memory 120 to perform the following steps: controlling the sensor 110 to capture a reference image and a processed image; capturing a first bright region and a dark region from the reference image, and capturing a second bright region from the processed image; performing calculations on a first brightness value of the first bright region and a second brightness value of the second bright region respectively with at least two first brightness thresholds, to obtain a first low exposure compensation value and a second low exposure compensation value; and obtaining a high exposure compensation value according to comparisons between a third brightness value of the dark region and at least two second brightness thresholds.

Figure 2:
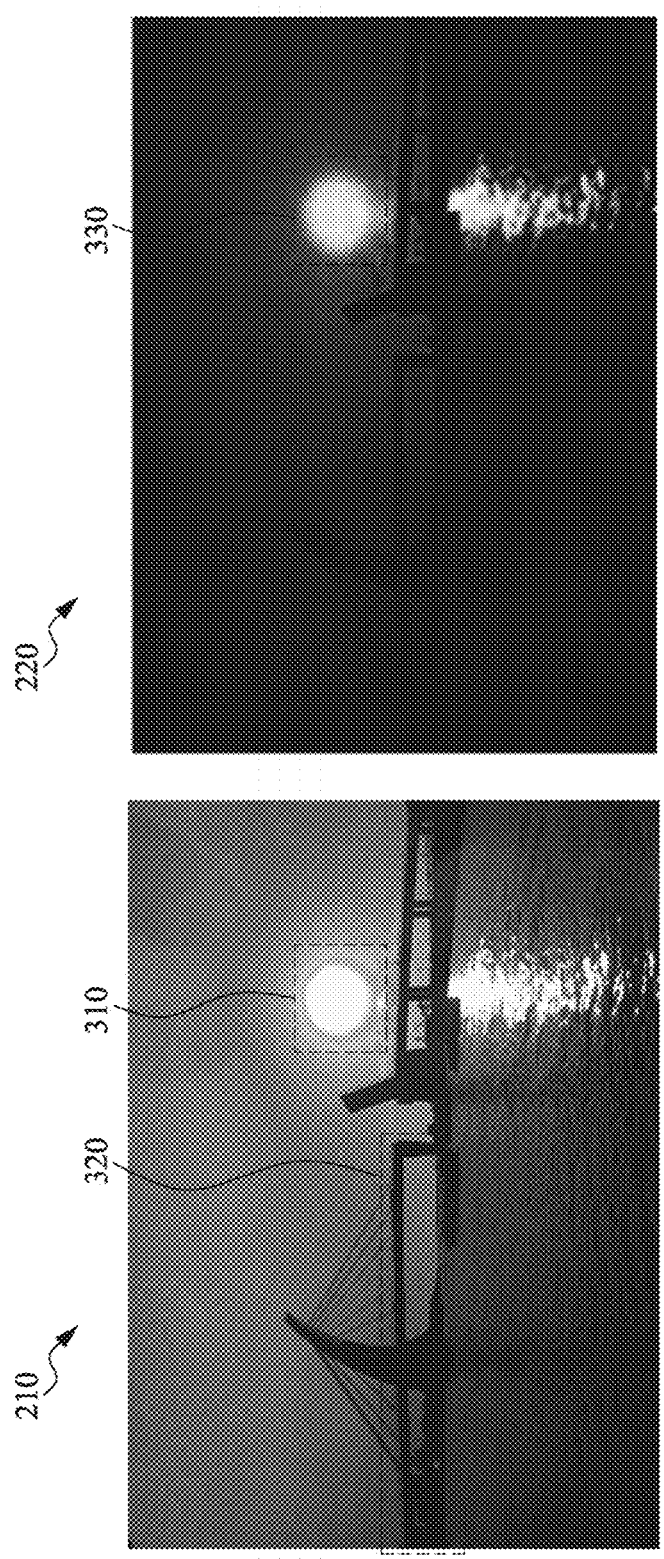
FIG. 2 is a schematic diagram of an image captured by an image capturing device according to an embodiment of the disclosure.

To make the foregoing operations of the image capturing device 100 comprehensible, reference is made to FIG. 2.

As shown in FIG. 1 and FIG. 2, in an embodiment, the processor 130 obtains the plurality of instructions from the memory 120 and controls the sensor 110 to capture a reference image 210 and a processed image 220. Then, the processor 130 captures a first bright region 310 and a dark region 320 from the reference image 210, and a second bright region 330 from the processed image 220. In an embodiment, the processor 130 captures the reference image 210 using the sensor 110. The reference image 210 may represent an exposure result and imaging information displayed on a current screen, or may be a pre-processed image of HDR. Next, the processor 130 captures the processed image 220 using the sensor 110. The processed image 220 may be a red, green, and blue (RGB) image generated after reducing image data from an original image file.

Then, the processor 130 performs calculations on a first brightness value of the first bright region 310 and a second brightness value of the second bright region 330 respectively with at least two first brightness thresholds, to obtain a first low exposure compensation value and a second low exposure compensation value. Subsequently, the processor 130 obtains a high exposure compensation value according to comparisons between a third brightness value of the dark region 320 and at least two second brightness thresholds. In an embodiment, the processor 130 performs linear interpolation on the first brightness value of the first bright region 310 and the at least two first brightness thresholds, to obtain the first low exposure compensation value. Then, the processor 130 performs linear interpolation on the second brightness value of the second bright region 330 and the at least two first brightness thresholds, to obtain the second low exposure compensation value. Further, the processor 130 performs linear interpolation on the third brightness value of the dark region 320 and the at least two second brightness thresholds, to obtain the high exposure compensation value.

In an embodiment, the processor 130 obtains the plurality of instructions from the memory 120 and controls the sensor 110 to perform the following steps: capturing information about a reference brightness of the reference image 210 and information about a processed brightness of the processed image 220; and creating a first brightness histogram and a second brightness histogram respectively according to the information about the reference brightness and the information about the processed brightness In an embodiment, the processor 130 collects information about various reference brightnesses in the reference image 210, and collects statistics from the information about the reference brightnesses, to create the first brightness histogram. Then, the processor 130 collects information about various processed brightnesses in the processed image 220, and collects statistics from the information about the processed brightnesses, to create the second brightness histogram.

In an embodiment, the processor 130 uses one of the first low exposure compensation value and the second low exposure compensation value as the low exposure compensation value. In an embodiment, if the first low exposure compensation value is 1, and the second low exposure compensation value is 2, the processor 130 selects the value of 1 or 2 as the low exposure compensation value.

In an embodiment, the processor 130 uses a smallest one of the first low exposure compensation value and the second low exposure compensation value as the low exposure compensation value. In an embodiment, if the first low exposure compensation value is 1 and the second low exposure compensation value is 2, the processor 130 selects the value of 1 as the low exposure compensation value.

Figure 3:
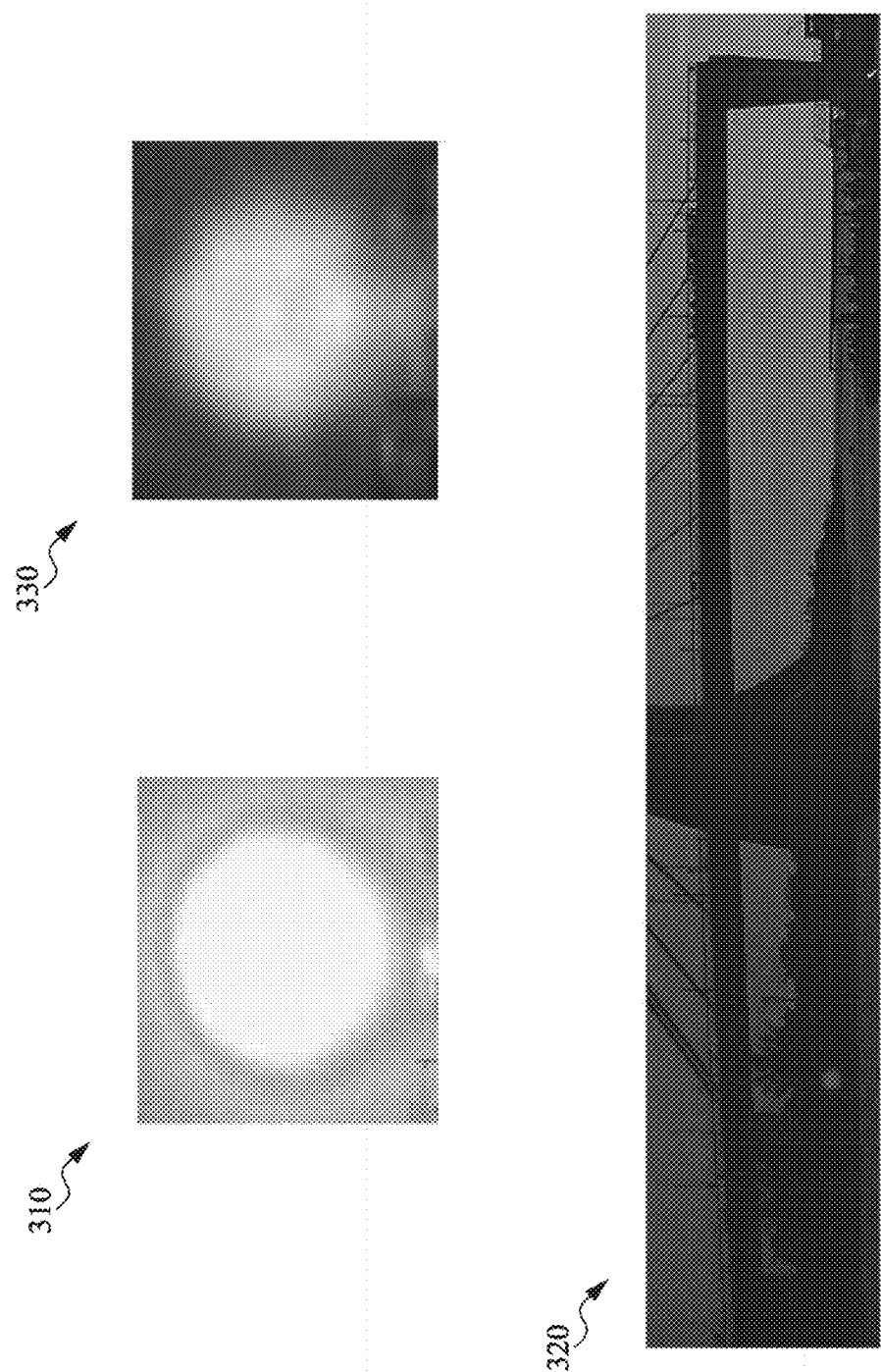
FIG. 3 is a schematic diagram of an image captured by an image capturing device according to another embodiment of the disclosure.

Referring to FIG. 2 and FIG. 3, in an embodiment, the processor 130 performs a region determination on the reference image 210, to determine region ratios of the first bright region 310 and the dark region 320 to the reference image 210. In an embodiment, the processor 130 finds a part with a grayscale brightness of 255 and a part with a grayscale brightness of 0 from the reference image 210 and performs a region determination according to the grayscale brightnesses of 255 and 0, to determine region ratios of the first bright region 310 and the dark region 320 to the reference image 210.

In an embodiment, the processor 130 captures a first brightness percentage region from the reference image 210 at a brightest part, where the first brightness percentage region is the first bright region 310. In an embodiment, a first brightness percentage is 10%. The processor 130 obtains a region with a brightness 10% lower than the highest grayscale brightness of 255 from the reference image 210 as the first bright region 310.

In an embodiment, the processor 130 captures a second brightness percentage region from the reference image 210 at a darkest part, where the second brightness percentage region is the dark region 320. In an embodiment, a second brightness percentage is 10%. The processor 130 obtains a region with a brightness 10% higher than the lowest grayscale brightness of 0 from the reference image 210 as the dark region 320.

In another embodiment, the processor 130 obtains the plurality of instructions from the memory 120 to perform the following steps: performing a region determination on the processed image 220, to determine a region ratio of the second bright region 330 to the processed image 220; and capturing a third brightness percentage region from the processed image 220 at a brightest part, where the third brightness percentage region is the second bright region 330. In an embodiment, the processor 130 finds a part with a grayscale brightness of 255 from the processed image 220 and performs a region determination according to the grayscale brightness of 255, to determine a region ratio of the second bright region to the processed image 220. Then, the third brightness percentage is 10%. The processor 130 obtains a region with a brightness 10% lower than the highest grayscale brightness of 255 from the processed image 220 as the third bright region 330.

Figure 4:
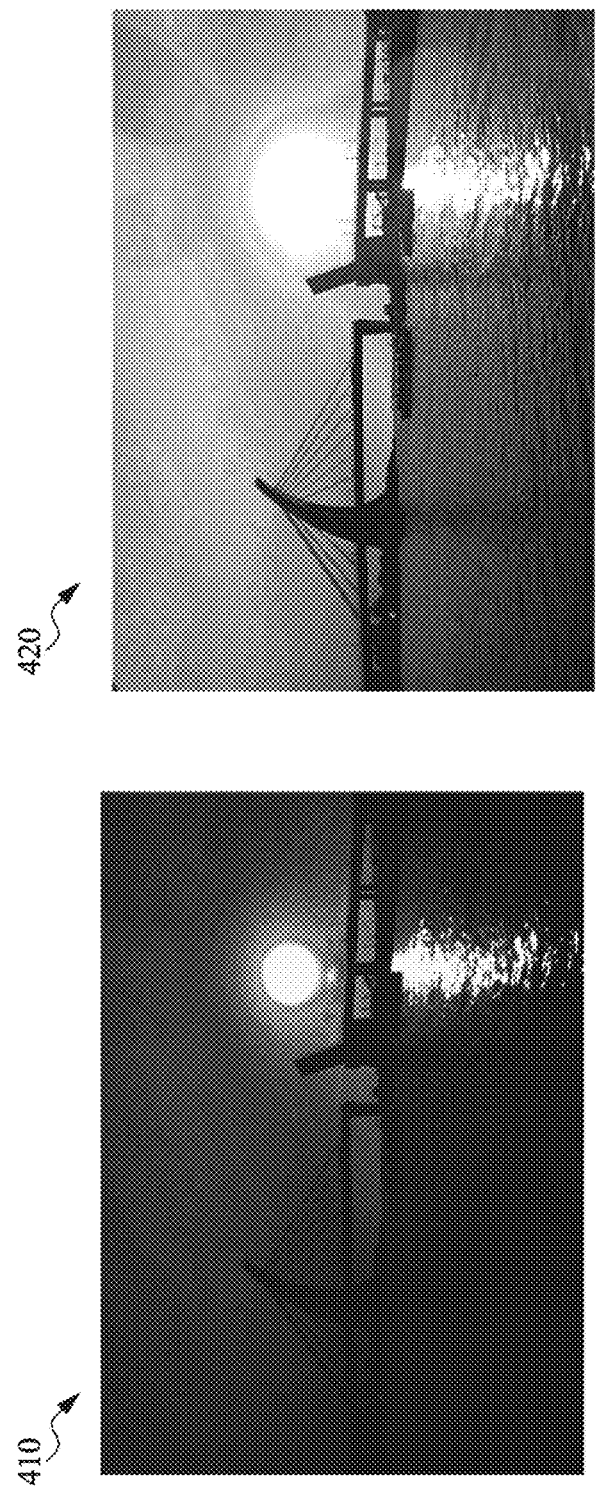
FIG. 4 is a schematic diagram of an image captured by an image capturing device according to still another embodiment of the disclosure.

Referring to FIG. 2 and FIG. 4, FIG. 4 is a schematic diagram of an image captured by an image capturing device according to still another embodiment of the disclosure. In an embodiment, the processor 130 makes the reference image 210 into a low-exposure image 410 according to the low exposure compensation value. The processor 130 makes the reference image 210 into a high-exposure image 420 according to the high exposure compensation value. In an embodiment, the processor 130 adjusts an exposure value in the reference image 210 according to the low exposure compensation value to make the reference image 210 into the low-exposure image 410. Then, in an embodiment, the processor 130 adjusts the exposure value in the reference image 210 according to the high exposure compensation value to make the reference image 210 into the high-exposure image 420.

FIG. 5 is a flowchart of an image calculation method 500 according to yet another embodiment of the disclosure. The image calculation method 500 includes the following steps:

Step 510: Capture a reference image and a processed image.

Step 520: Capture a first bright region and a dark region from the reference image, and capture a second bright region from the processed image.

Step 530: Perform calculations on a first brightness value of the first bright region and a second brightness value of the second bright region respectively with at least two first brightness thresholds, to obtain a first low exposure compensation value and a second low exposure compensation value.

Step 540: Obtain a high exposure compensation value according to comparisons between a third brightness value of the dark region and at least two second brightness thresholds.

To make the image calculation method 500 comprehensible, reference is made to FIG. 1 to FIG. 5. In step 510, a processor 130 is configured to capture the reference image 210 and the processed image 220. Then, referring to step 520, the processor 130 is configured to capture a first bright region 310 and a dark region 320 from the reference image 210, and capture a second bright region 330 from the processed image 220. Then, referring to step 530, the processor 130 is configured to perform calculations on a first brightness value of the first bright region 310 and a second brightness value of the second bright region 330 respectively with at least two first brightness thresholds, to obtain a first low exposure compensation value and a second low exposure compensation value. Subsequently, referring to step 540, the processor 130 is configured to obtain a high exposure compensation value according to comparisons between a third brightness value of the dark region 320 and at least two second brightness thresholds.

In an embodiment, referring to step 510, the processor 130 is further configured to capture information about a reference brightness of the reference image 210 and information about a processed brightness of the processed image 220, and create a first brightness histogram and a second brightness histogram respectively according to the information about the reference brightness and the information about the processed brightness.

In an embodiment, referring to step 530, the processor 130 is configured to use one of the first low exposure compensation value and the second low exposure compensation value as the low exposure compensation value.

In an embodiment, referring to step 530, the processor 130 is configured to use a smallest one of the first low exposure compensation value and the second low exposure compensation value as the low exposure compensation value.

In an embodiment, referring to step 520, the processor 130 is further configured to perform a region determination on the reference image 210, to determine region ratios of the first bright region 310 and the dark region 320 to the reference image 210.

In an embodiment, referring to step 520, the processor 130 is further configured to capture a first brightness percentage region from the reference image 210 at a brightest part, where the first brightness percentage region is the first bright region 310, and capture a second brightness percentage region from the reference image 210 at a darkest part, where the second brightness percentage region is the dark region 320.

In an embodiment, referring to step 520, the processor 130 is further configured to perform a region determination on the processed image 220, to determine a region ratio of the second bright region 330 to the processed image 220, and capture a third brightness percentage region from the processed image 220 at a brightest part, where the third brightness percentage region is the second bright region 330.

It should be noted that, a person of ordinary knowledge in the art understands that steps of the image calculation method 500 are drafted according to the implemented functions, are only intended to make the technology in the disclosure more comprehensible, and are not intended to limit the steps. Integrating steps into a same step, splitting a step into a plurality of steps, replacing any step for execution in another step, or adjusting an order of steps still belongs to the implementations in the content of the disclosure. In addition, the image capturing device 100 shown in FIG. 1 to FIG. 4 are only used to describe the steps of the image calculation method 500 exemplarily. However, the image calculation method 500 is not performed by the image capturing device 100 only.

According to the foregoing implementations of the disclosure, application of the disclosure has the following advantages. The embodiments of the disclosure provide an image capturing device and an image calculation method, to improve the tolerance of quality of synthetic images, thereby reducing the occurrence of ghosting or shadowing.

Although the specific embodiments of the disclosure are disclosed in the above implementations, the embodiments are not intended to limit the disclosure. A person of ordinary skill in the art may make variations and modifications without departing from the principle and spirit of the disclosure. Therefore, the protection scope of the disclosure should be subject to the appended claims.

What is claimed is:

1. An image capturing device, comprising:
    a sensor, configured to capture an image of at least one target;
    a memory, configured to store a plurality of instructions; and
    a processor, configured to obtain the instructions from the memory to perform the following steps:
    controlling the sensor to capture a reference image and a processed image;
    capturing a first bright region and a dark region from the reference image, and capturing a second bright region from the processed image;
    performing calculations on a first brightness value of the first bright region with at least two first brightness thresholds to obtain a first low exposure compensation value and performing calculations on a second brightness value of the second bright region with another at least two first brightness thresholds, to obtain a second low exposure compensation value;
    obtaining a high exposure compensation value according to comparisons between a third brightness value of the dark region and at least two second brightness thresholds; and
    adjusting an exposure value in the reference image according to at least one of: the first low exposure compensation value, the second low exposure compensation value, or the high exposure compensation value.

2. The image capturing device according to claim 1, wherein the processor obtains the instructions from the memory to perform the following steps:

capturing information about a reference brightness of the reference image and information about a processed brightness of the processed image; and creating a first brightness histogram and a second brightness histogram respectively according to the information about the reference brightness and the information about the processed brightness.

3. The image capturing device according to claim 1, wherein one of the first low exposure compensation value and the second low exposure compensation value is used as a low exposure compensation value;

wherein the processor obtains the instructions from the memory to perform the following step:

adjusting the exposure value in the reference image according to the low exposure compensation value.

4. The image capturing device according to claim 1, wherein a smallest one of the first low exposure compensation value and the second low exposure compensation value is used as a low exposure compensation value;

wherein the processor obtains the instructions from the memory to perform the following step:

adjusting the exposure value in the reference image according to the low exposure compensation value.

5. The image capturing device according to claim 1, wherein the processor obtains the instructions from the memory to perform the following steps:

performing a region determination on the reference image, to determine region ratios of the first bright region and the dark region to the reference image.

6. The image capturing device according to claim 5, wherein the processor obtains the instructions from the memory to perform the following steps:

capturing a first brightness percentage region from the reference image at a brightest part, wherein the first brightness percentage region is the first bright region.

7. The image capturing device according to claim 5, wherein the processor obtains the instructions from the memory to perform the following steps:

capturing a second brightness percentage region from the reference image at a darkest part, wherein the second brightness percentage region is the dark region.

8. The image capturing device according to claim 1, wherein the processor obtains the instructions from the memory to perform the following steps:

performing a region determination on the processed image, to determine a region ratio of the second bright region to the processed image; and capturing a third brightness percentage region from the processed image at a brightest part, wherein the third brightness percentage region is the second bright region.

9. An image calculation method, comprising:

capturing a reference image and a processed image;

capturing a first bright region and a dark region from the reference image, and capturing a second bright region from the processed image;

performing calculations on a first brightness value of the first bright region with at least two first brightness thresholds to obtain a first low exposure compensation value and performing calculations on a second brightness value of the second bright region with another at least two first brightness thresholds, to obtain a second low exposure compensation value;

obtaining a high exposure compensation value according to comparisons between a third brightness value of the dark region and at least two second brightness thresholds; and adjusting an exposure value in the reference image according to at least one of: the first low exposure compensation value, the second low exposure compensation value, or the high exposure compensation value.

10. The image calculation method according to claim 9, wherein the step of capturing a reference image and a processed image comprises:

capturing information about a reference brightness of the reference image and information about a processed brightness of the processed image; and creating a first brightness histogram and a second brightness histogram respectively according to the information about the reference brightness and the information about the processed brightness.

11. The image calculation method according to claim 9, wherein one of the first low exposure compensation value and the second low exposure compensation value is used as a low exposure compensation value;

wherein the image calculation method comprises:

adjusting the exposure value in the reference image according to the low exposure compensation value.

12. The image calculation method according to claim 9, wherein a smallest one of the first low exposure compensation value and the second low exposure compensation value is used as a low exposure compensation value;

wherein the image calculation method comprises:

adjusting the exposure value in the reference image according to the low exposure compensation value.

13. The image calculation method according to claim 9, wherein the step of capturing a first bright region and a dark region from the reference image comprises:

performing a region determination on the reference image, to determine region ratios of the first bright region and the dark region to the reference image.

14. The image calculation method according to claim 13, wherein the step of capturing a first bright region and a dark region from the reference image further comprises:

capturing a first brightness percentage region from the reference image at a brightest part, wherein the first brightness percentage region is the first bright region; and capturing a second brightness percentage region from the reference image at a darkest part, wherein the second brightness percentage region is the dark region.

15. The image calculation method according to claim 9, wherein the step of capturing a second bright region from the processed image comprises:

performing a region determination on the processed image, to determine a region ratio of the second bright region to the processed image; and capturing a third brightness percentage region from the processed image at a brightest part, wherein the third brightness percentage region is the second bright region.

* * * * *